UNITED STATES PATENT OFFICE.

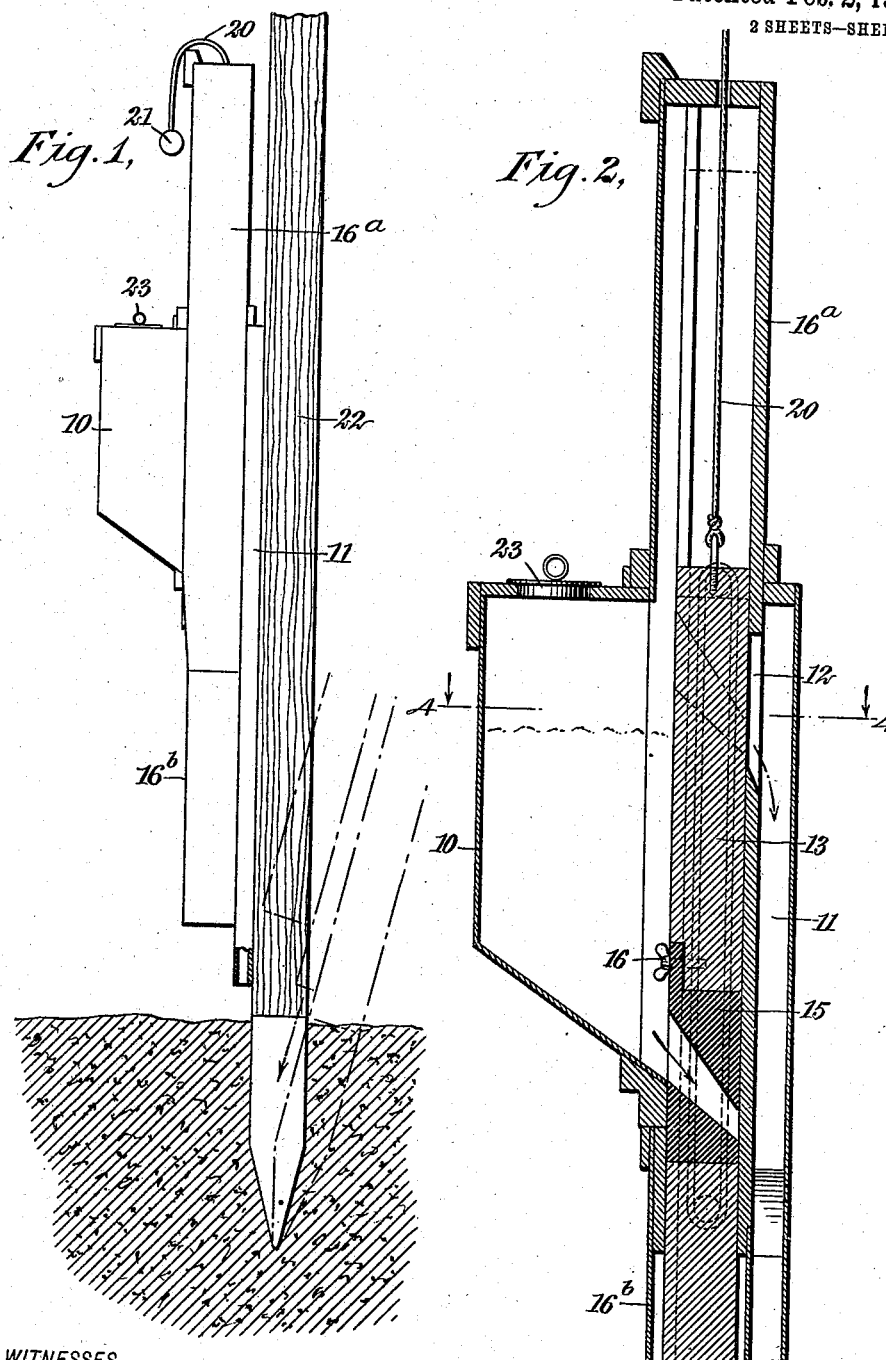

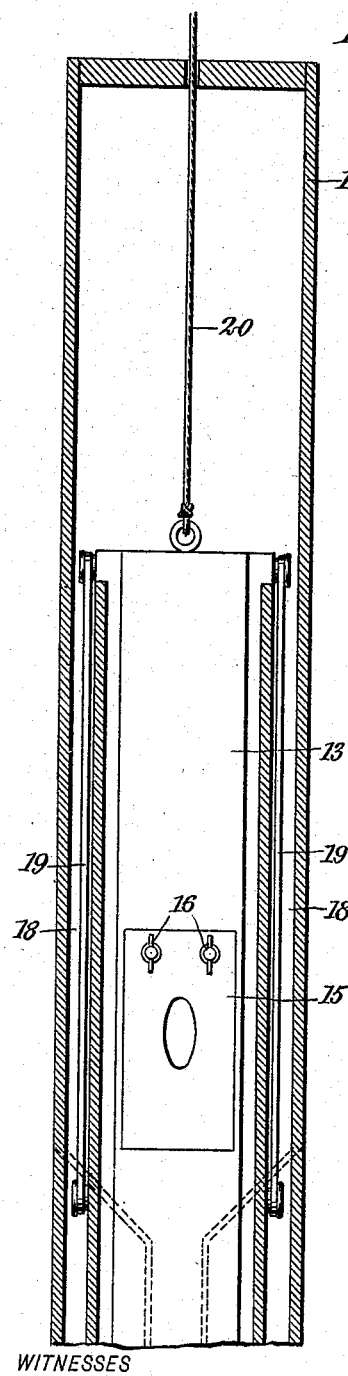
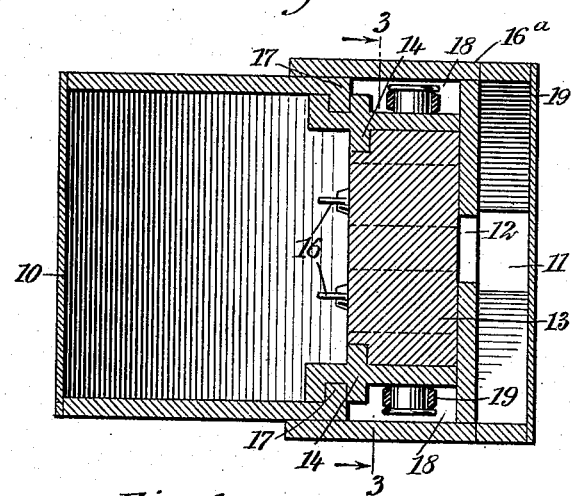
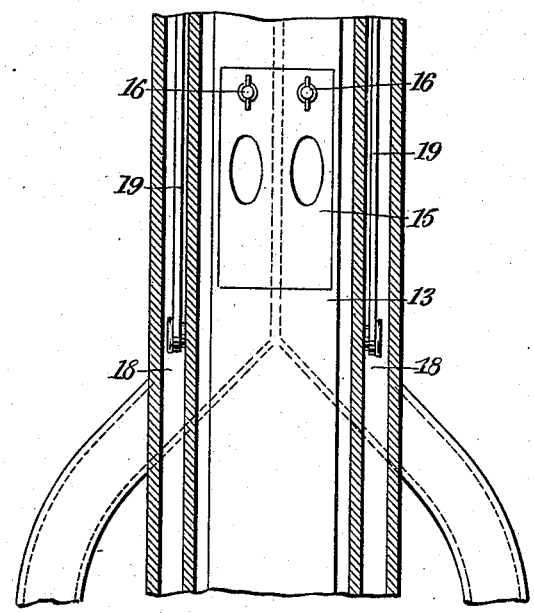
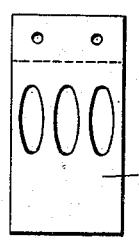

SALVADOR AGUSTIN SIERRA, OF CARACAS, VENEZUELA.

MANUAL PLANTER.

No. 911,453.     Specification of Letters Patent.     Patented Feb. 2, 1909.

Application filed June 25, 1908. Serial No. 440,258.

*To all whom it may concern:*

Be it known that I, SALVADOR AGUSTIN SIERRA, a citizen of the Republic of Venezuela, and a resident of Caracas, Venezuela, South America, have invented a new and Improved Manual Planter, of which the following is a full, clear, and exact description.

This invention is an improvement in manually-operated seed planters, and has in view such a device embodying in its construction a seed box, a discharge chute extending above the bottom of the box having an opening, and an elevator having a seed holder, means forcing the elevator downwardly and normally retaining the seed holder at the bottom of the box, and means for raising the elevator against the tension of the last mentioned means to bring the seed holder into register with the opening and deliver the seed into the chute.

The planter is primarily designed to be applied to a seed hole digger in the nature of a pointed stick which is thrust in the ground and turned to one side to produce an opening for receiving the seed as they are dropped from the discharge chute.

Reference is to be had to the accompanying drawings forming a part of this specification, in which similar characters of reference indicate corresponding parts in all the views.

Figure 1 is a side elevation of my improved planter complete as applied to a seed hole digger; Fig. 2 is a central vertical section of the planter on an enlarged scale; Fig. 3 is a section of the same substantially on the line 3—3 of Fig. 4, looking in the direction of the arrows; Fig. 4 is a cross-section substantially on the line 4—4 of Fig. 2, looking in the direction of the arrows; Fig. 5 is a fragmentary section similar to Fig. 3, showing the planter constructed to simultaneously feed two batches of seed at the same time; and Fig. 6 shows a feed block for my improved planter constructed to feed three batches of seed.

In the construction of my improved planter I employ a seed box or hopper 10 provided with a discharge chute 11 at its rear side having a communicating opening 12 therewith near its top. Adjacent to the wall separating the seed box from the chute is arranged a feed elevator for lifting the seed from the box and discharging them through the opening 12 into the chute, the elevator being in the nature of a block 13 slidable in the box on upright guides 14, as best shown in Fig. 4. The block 13 carries a seed holder 15 which is detachably connected by suitable devices such as the thumbscrews 16, the seed holder being provided with an opening downwardly inclining toward the chute, which, as shown, is of tapering or elliptical form, with the enlarged portion arranged adjacent to the seed box. The special form of this opening will, however, be varied according to the shape of the seed to be planted.

The guides for the feed block 13 are extended both above and below the seed box to lie within a trough casing 16$^a$, the lower section 16$^b$ of this casing, which receives the lower end of the feed block 13, being made detachable from the feed chute. The front portion of the seed box is also detachably connected to the casing 16$^a$, which is effected by constructing the box with ribs or guides 17 slidable in corresponding grooves formed in the side walls of the elevator shaft, as best shown in Fig. 4. These walls in connection with the side walls of the casing 16$^a$ provide channels 18 which receive elastic bands, springs, or other equivalent devices 19, the lower ends of which are attached to the casing, and the upper ends to the block 13, operating to automatically return this block, which constitutes the elevator, to the position shown in Fig. 2 after it has been drawn upwardly to bring the opening in the seed holder in register with the opening 12, this upward movement of the block being accomplished by a flexible member 20 which passes through the top of the casing 16$^a$, where it is provided with an operating handle 21.

The planter is ordinarily attached to the side of a seed hole digger in the nature of a pointed stick 22, as shown in Fig. 1. In planting, this stick is thrust into the ground after the seed box has been filled to about the height indicated in Fig. 2 through the opening closed by the filling plug 23. The stick is then turned to the side, as indicated in dotted outline in Fig. 1, which enlarges the opening and brings the end of the discharge chute directly thereover. By now pulling on the handle 21 to bring the elevator to the limit of its upward movement, the seed carried from the seed box by the seed holder are delivered through the opening into the discharge chute and dropped into the hole produced. The detachable nature of the seed holder and the discharge chute admits of the replacement of these parts respectively by a double holder and chute as illustrated in Fig. 5, in which case the planter should also be provided with a fork or double ended seed hole digger. Access may be had to the seed holder in removing and replacing it by another by sliding off the front of the seed box.

In Fig. 6 I have shown a seed holder having three openings, in which case it will obviously be necessary that the feed chute be provided with as many branches, and the seed hole digger be accordingly constructed.

Having thus described my invention I claim as new and desire to secure by Letters Patent:

1. The combination of a casing constructed of two detachable sections arranged in endwise alinement and providing an elevator shaft, a seed box slidably confined intermediate the length of the casing in communication with the shaft, a discharge chute carried by the lower section of the casing, and an elevator slidably mounted in the shaft for feeding the seed into the chute.

2. The combination of a seed box, a discharge chute arranged at the rear of the box having a plurality of branches diverging at their lower ends, and a feed box slidably mounted between the chute and the seed box, having a seed holder for elevating the seed from the box and discharging them into the chute.

3. The combination of a casing having a discharge chute and an elevator shaft, with the chute and shaft having a communicating opening near the top of the chute, a seed box attached intermediate the length of the casing, a feed block slidable in the elevator shaft having a seed holder, means for lifting the feed block into the shaft to bring the seed holder into register with said opening to deliver the seed therethrough into the discharge chute, and resilient devices connected to the opposite sides of the block and casing for automatically returning the block when the last-mentioned means are released.

4. The combination of a casing having a shaft, a seed box detachably connected to the casing, a discharge chute having an opening near its top in communication therewith, a feed block slidable in the shaft of the casing, a seed holder having an opening passing therethrough inclining downwardly toward the chute, means forcing the feed block downwardly and normally retaining the seed holder at the bottom of the seed box, and means for elevating the feed box against the tension of the last mentioned means to bring the opening of the seed holder into register with the opening in the chute.

5. The combination of a seed box, a casing extending both above and below the box, having an elevator shaft in communication with the box and provided with channels at each side of said shaft, a discharge chute at the rear of the casing, having an opening arranged above the bottom of the seed box, an elevator slidable in the elevator shaft, having a seed holder, means arranged within said channels, forcing the elevator downwardly and normally retaining the seed holder at the bottom of the box, and a flexible member attached to the elevator and extending through the top of the casing for lifting the elevator against the tension of the last mentioned means to carry the seed holder in register with the opening in the discharge chute.

In testimony whereof I have signed my name to this specification in the presence of two subscribing witnesses.

SALVADOR AGUSTIN SIERRA.

Witnesses:
N. ALVARENGALS,
H. ABADIE.